UNITED STATES PATENT OFFICE.

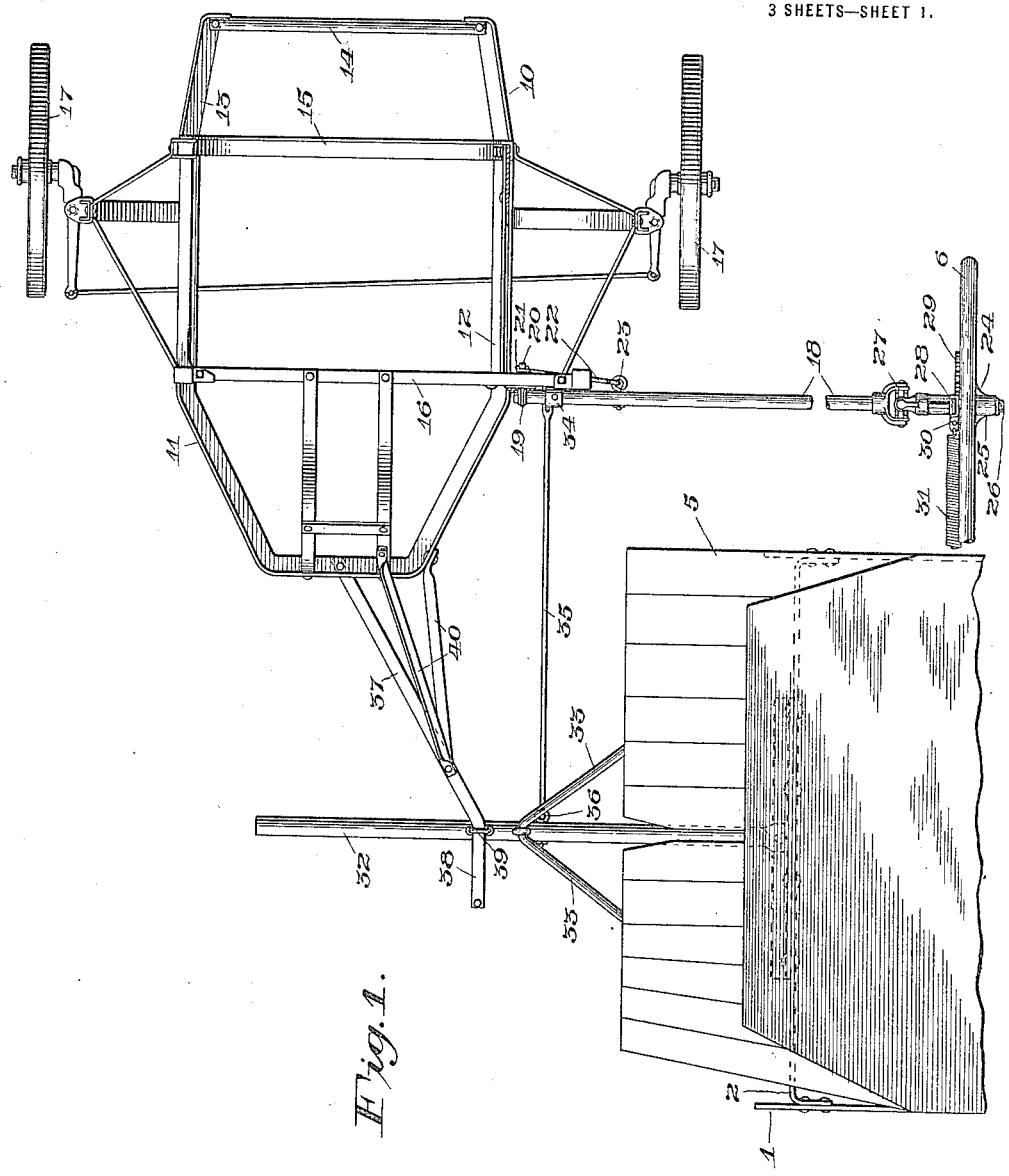

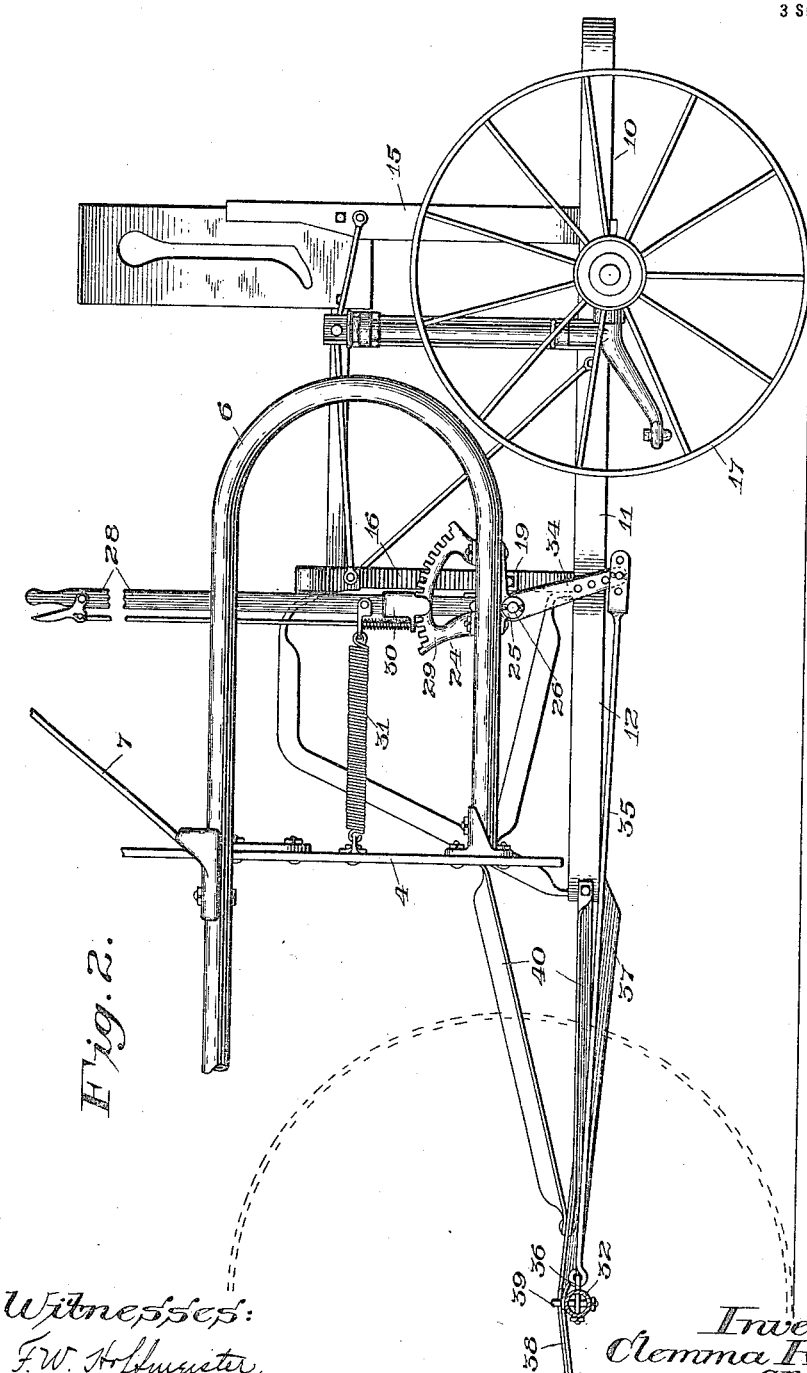

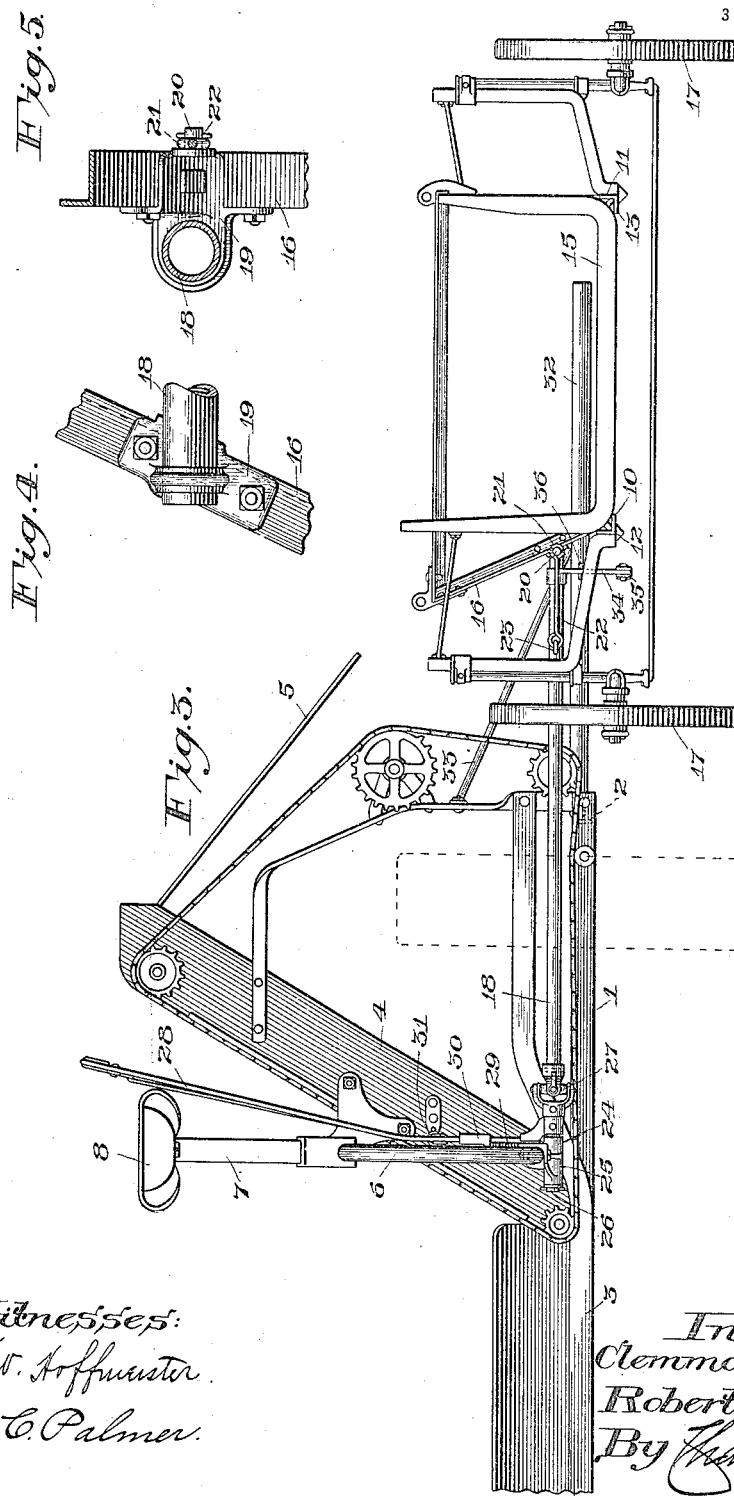

CLEMMA R. RANEY, OF CHICAGO, AND ROBERT C. LIVESAY, OF BERWYN, ILLINOIS, ASSIGNORS TO INTERNATIONAL HARVESTER COMPANY OF NEW JERSEY, A CORPORATION OF NEW JERSEY.

GRAIN-SHOCKER.

1,226,371.   Specification of Letters Patent.   Patented May 15, 1917.

Application filed January 6, 1913. Serial No. 740,483.

*To all whom it may concern:*

Be it known that we, CLEMMA R. RANEY and ROBERT C. LIVESAY, citizens of the United States, residing at Chicago, in the county of Cook and State of Illinois, and at Berwyn, in the county of Cook and State of Illinois, respectively, have invented certain new and useful Improvements in Grain-Shockers, of which the following is a specification.

Our invention relates to grain shocker attachments for harvesters, wherein the shocker is connected with a harvester and adapted to receive the bound bundles from the binder deck of the harvester and form them into a shock that is deposited upon the ground, and consists in improved means whereby without interruption of the forward movement of the binder the shocker attachment may be adjusted by the operator on the binder in a fore and aft direction relative to the line of draft of the harvester in a manner to control the position of the bundles as they are delivered from the harvester to the shocking mechanism; the object of our invention being to provide a mechanism that will perform the function indicated in an efficient and positive manner, and one controllable at the will of the operator.

We attain these objects by means of mechanism, one embodiment of which is illustrated in the accompanying drawings, in which—

Figure 1 is a top plan view of part of a grain harvester and shocker attachment having our invention embodied in the construction thereof;

Fig. 2 is a side elevation of Fig. 1;

Fig. 3 is a rear end elevation of part of a grain harvester and shocker attachment, designed to illustrate the operation of our invention;

Fig. 4 is a detached detail of part of the shocker controlling mechanism; and

Fig. 5 is a side elevation of Fig. 4.

The same reference characters designate like parts throughout the several views.

1 represents the wheeled frame of a harvester having a longitudinally arranged frame member 2 at the stubbleward side thereof; 3 the grain platform; 4 the grain elevator operative to deliver the grain to the binder deck 5, that is inclined downward and stubbleward from the delivery end of the grain elevator toward the binder attachment (not shown), and 6 represents the seat supporting member having the seat spring 7 secured thereto that carries the seat 8.

10 represents the main frame of a grain shocking attachment, including a substantially U-shaped member 11 having fore and aft parallel members 12 and 13 upon the grainward and stubbleward sides thereof, respectively, that have their rear ends connected by means of the transverse bar 14, and 15 represents an intermediate transverse bar near the rear end of the frame, having opposite ends thereof secured to the side members 12 and 13, and 16 a transverse frame member secured to members 12 and 13 near their front ends. 17 represents the shocker carrying wheels upon which the main frame 10 is mounted. 18 represents a rock shaft arranged at right angles with the line of draft of the machine, having the stubbleward end thereof loosely received by a bracket member 19 that is secured to the frame member 16, and provided with a rearwardly projecting stem portion 20 that is received by an eye member 21 at one end of a link 22, the opposite end of the link being flexibly connected with the rock shaft 18 by means of an eye bolt 23.

24 represents a bracket member secured to the seat supporting member 6 of the harvester frame and provided with a transversely arranged sleeve member 25, in which is journaled a rock shaft 26, and 27 represents a universal coupling mechanism connecting the grainward end of rock shaft 18 with the stubbleward end of the rock shaft 26. 28 represents a hand lever having the lower end thereof secured to the rock shaft 26 and its upper end extending within reach of the operator. 29 represents a toothed sector integral with the bracket member 24, and 30 a spring-pressed sliding detent carried by the lever 28 and adapted to engage with the toothed sector 29 in a manner to secure the hand lever 28 in any position of adjustment in a well-known way. 31 represents a tension spring having one end thereof connected with the frame of the harvester and its opposite end with the hand lever 28, and operative to yieldingly swing the hand lever in one direction. 32 represents a draft member arranged at right angles with the line of draft of the machine, having the grainward end thereof secured to the member 2 of the wheeled frame of the harvester, and 33 represents brace members connected with the draft member 32 and the wheeled frame of the harvester in a manner to support the draft member against displacement. 34 represents a depending arm secured to the rock shaft 18 near the stubbleward end thereof, and 35 a draft link arranged parallel with the line of draft of the machine, having the rear end thereof pivotally connected with the lower end of arm 34, and its opposite end connected with the draft member 32 by means of an eye bolt 36.

37 represents a reach member having the rear end thereof secured to the front end of the main frame of the shocker, and inclined forward and grainward, being provided with a portion 38 at the front end thereof that is arranged parallel with the line of draft of the machine and slidably connected with the draft member 32 by means of a loop member 39, while 40 represents brace members connecting the body of this reach member with the wheeled frame of the shocker attachment.

In operation the shocker attachment is drawn forward by means of the draft link 35, and the reach member 37 operates to sustain it against a lateral swinging movement relative to the line of draft of the machine, and owing to the flexible connection between the harvester frame and the wheeled frame of the shocker attachment, either frame may rise and fall to a limited extent independent of the other.

While we have in this application specifically described one embodiment of our invention, it is to be understood that the form chosen is used for purposes of illustration and that the invention itself may be embodied in other forms without departing from its spirit, it being our intention to include all such embodiments within the scope of the appended claims.

What we claim as our invention, and desire to secure by Letters Patent, is:

1. In combination, a harvester, a shocker, draft connections between said harvester and said shocker, and means carried by and operable from the harvester for adjusting the shocker bodily at the will of the operator in a fore and aft direction relative to the line of draft of the machine.

2. In combination, a harvester, a shocker, draft connections between said harvester and said shocker, means operable while the harvester is moving forward whereby said shocker may be adjusted at the will of the operator in a fore and aft direction relative to the line of draft of the machine, and means operative to counterbalance the draft of the shocker.

3. In combination, a harvester, a shocker, draft connections between said harvester and said shocker, means operable from the harvester whereby said shocker may be adjusted at the will of the operator in a fore and aft direction relative to the line of draft of the machine, and resilient means operative to counterbalance the draft of said shocker.

4. In combination, a harvester, a shocker, draft connections between said harvester and said shocker, and means including a lever mechanism carried by said harvester and operative at the will of the operator and from the harvester to adjust said shocker in a fore and aft direction relative to the line of draft of the machine while the latter is moving forward.

5. In combination, a harvester, a shocker, draft connections between said harvester and said shocker, and means including a lever mechanism carried by said harvester and operative at the will of the operator while the machine is moving forward to adjust said shocker in a fore and aft direction relative to the line of draft of the machine, and a spring mechanism connected with said hand lever mechanism and operative to counterbalance the draft of said shocker.

6. In combination, a harvester, a shocker, and draft connections between said harvester and shocker whereby the latter may be adjusted longitudinally of the line of draft, including a member journaled on said harvester and shocker and operable from the harvester.

7. In combination, a harvester, a shocker, and means between said harvester and shocker whereby the latter may be adjusted longitudinally of the line of draft including a draft member journaled on said harvester, a draft member journaled on said shocker, and means connecting said draft members whereby said harvester and shocker may rise and fall relative to one another.

8. In combination, a harvester, a shocker, and means between said harvester and shocker whereby the latter may be adjusted longitudinally of the line of draft, including a member journaled on said harvester and shocker and a coöperating connection between said member and said harvester.

9. In combination, a harvester, a shocker, and draft connections between said harvester and said shocker whereby the latter may be adjusted longitudinally of said harvester, including a member journaled on said harvester and shocker, operative connections between said member and said harvester, and means for rotating said member and thereby adjusting said shocker.

10. In combination, a harvester, a shocker, draft connections between said harvester and said shocker, said draft connections including a rock shaft journaled on said harvester and shocker, a draft link connection between said rock shaft and said harvester, and means for rocking said shaft in a manner to adjust said shocker in a fore and aft direction relative to the line of draft of the machine.

11. In combination, a harvester, a shocker, draft connections between said harvester and said shocker said draft connections including a rock shaft having one end thereof journaled in a bearing carried by said harvester, the opposite end of said shaft journaled in a bearing carried by said shocker, and draft connections between said shaft and said harvester operable upon the rocking of said shaft to adjust said shocker in a fore and aft direction relative to the line of draft of the machine.

12. In combination, a harvester, a shocker, draft connections between said harvester and said shocker, said draft connections including a transversely arranged rock shaft having the grainward end thereof journaled in a bearing carried by said harvester and the opposite end thereof journaled in a bearing carried by a fixed part of said shocker, a link connection between said rock shaft and said shocker, an arm secured to said rock shaft, a longitudinally arranged draft link connecting said arm with said harvester, and means for rocking said shaft in a manner to adjust said shocker in a fore and aft direction relative to the line of draft of the machine.

13. In combination, a harvester, a shocker, draft connections between said harvester and said shocker, said draft connections including a reach bar carried by said shocker and having a slidable connection with said harvester, a rock shaft journaled on said harvester and shocker, adjustable draft connections connecting said rock shaft with said harvester, and a hand lever mechanism carried by said harvester and operatively connected with said rock shaft whereby the operator may at will adjust said shocker in a fore and aft direction relative to the line of draft of the machine.

14. In combination, a harvester, a shocker, draft connections between said harvester and shocker including a draft member carried on said harvester and slidably connected to said shocker, and means connecting said draft member and shocker for preventing separation of the shocker and harvester while in operation.

15. In combination, a harvester, a shocker, draft connections between said harvester and said shocker, said draft connections including a member journaled on said harvester and shocker, operative connections between the same and said harvester, means for rotating said member and thereby adjusting said shocker longitudinally of said harvester, and means for varying the adjustment of said shocker upon a given rotation of said member.

16. In combination, a harvester, a shocker, a transversely disposed member projecting from said harvester, a second transversely disposed member journaled on said harvester and shocker, operative connections between said shocker and said first mentioned transversely disposed member, and operative connections between said second transversely disposed member and said harvester whereby upon rotation of said member said shocker is adjusted in a fore and aft direction and relative to said first mentioned member.

17. In combination, a harvester, a shocker, a transversely disposed member projecting from said harvester, slidable connections between the same and said shocker, a second transversely disposed member journaled in rear of said member on said shocker and harvester and having a crank thereon, and a longitudinally disposed draft link pivotally connected to said harvester and to said crank whereby upon rotation of said journaled member the shocker may be adjusted longitudinally relative to the line of draft.

18. In combination, a harvester, a laterally extending member protruding therefrom, a shocker having a tongue slidably connected to said laterally extending member, a seat support on said harvester, a member flexible in a vertical plane journaled on said seat pipe and said shocker, a crank carried by said member, a draft connection between said crank and said laterally extending member, a lever for controlling the angular position of said journaled member and crank, and resilient means connected between said lever and harvester.

19. In combination, a harvester including a wheeled frame, a shocker, draft connections between said shocker and said harvester, said draft connections including a draft member secured to the wheeled frame of the harvester and extending stubbleward therefrom at right angles to the line of draft of the machine, a transversely arranged rock shaft having the stubbleward end thereof journaled in a bearing carried by said shocker and the opposite end in a bearing carried by said harvester, an arm on said rock shaft, a link connecting said arm with said draft member, a reach bar forming part of said shocker and having a slidable connection with said draft member, and means for rocking said shaft in a manner to adjust said shocker in a fore and aft direction relative to the line of draft of the machine.

CLEMMA R. RANEY.
ROBERT C. LIVESAY.

Witnesses for Raney:
E. L. BACON,
O. D. GRZEGORZEWSKI,

Witnesses for Livesay:
O. J. MEINHARD,
W. E. TAYLOR.

Copies of this patent may be obtained for five cents each, by addressing the "Commissioner of Patents, Washington, D. C."